Dec. 4, 1956     A. FERRI     2,772,620
AIR INLET FOR SUPERSONIC AIRPLANE OR MISSILE
Filed July 3, 1952
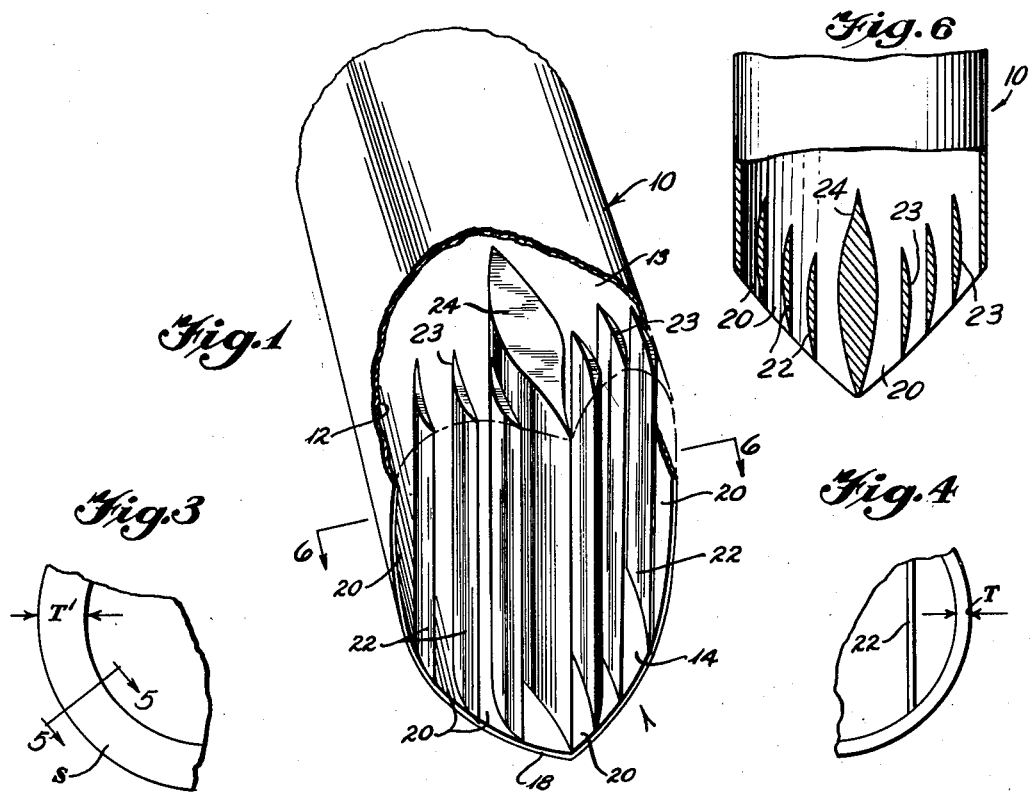
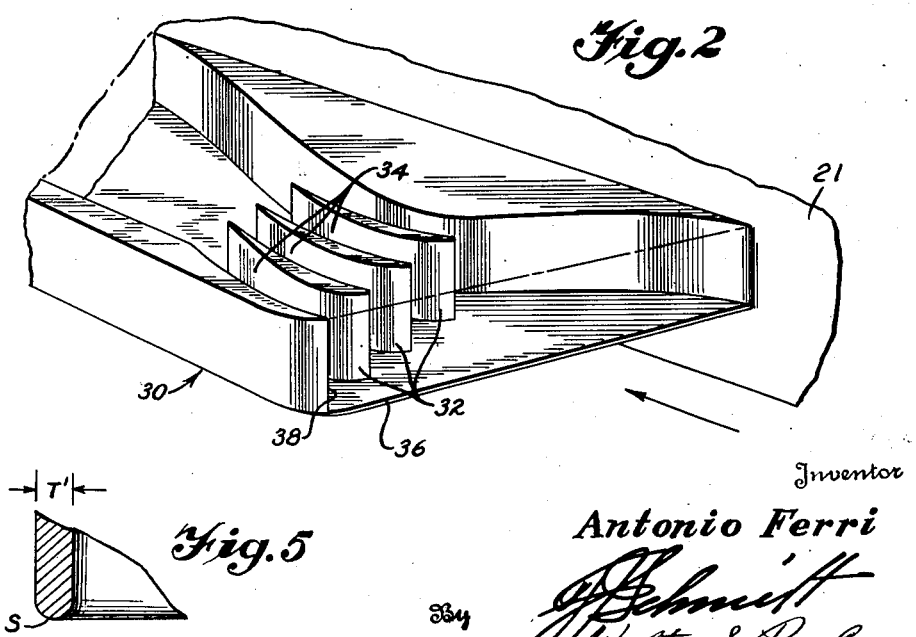
Inventor
Antonio Ferri

United States Patent Office

2,772,620
Patented Dec. 4, 1956

2,772,620

AIR INLET FOR SUPERSONIC AIRPLANE OR MISSILE

Antonio Ferri, Queens County, N. Y.

Application July 3, 1952, Serial No. 297,194

2 Claims. (Cl. 98—1)

(Granted under Title 35, U. S. Code (1952), sec. 266)

The invention described herein may be manufactured and used by or for the Government of the United States of America for governmental purposes without the payment of any royalties thereon or therefor.

This invention relates to improvements in the air inlets for supersonic aircraft, either the piloted or pilotless type.

At the present time, air inlets having large external compression, or inlets having small external compression with converging-diverging diffusers inside the entrance, are used. External compression is the tendency of air to pile up and be compressed ahead of a fast moving object rather than flow around it, thus creating drag. These inlets are operative, but their performance is low, that is, they operate with high external drag (inlet with large external compression) or with low pressure recovery (high losses). Pressure recovery is the capacity of a diffuser to convert the high velocity and low static pressure of supersonic air to high static pressure and low velocity. An object of this invention is to provide a supersonic air inlet capable of taking air into an aircraft and decreasing the speed of the air from supersonic speed to low speed with small losses and without introducing a large amount of drag.

Another object of the invention is to provide an improved supersonic air inlet for an aircraft or any suitable component thereof, for example a wing nacelle, which reduces the passage length required for air diffusion giving much less internal and external skin friction area and making possible a considerably shorter ram jet body in an aircraft power plant.

A specific object of the invention is to provide a supersonic air inlet with a grill which divides the total streamtube into a number of channels, each of which is similar to a single small inlet. In this way, the pressure recovery is the same as the pressure recovery of an inlet having large external compression, but the curvature of the external surface is larger and the external drag is reduced in proportion to the number of passages used.

Other objects and features as well as uses of the invention will become apparent to those skilled in the art. Even though only two embodiments of the invention are illustrated, it is obvious that the invention may be practiced in many structural forms.

In the drawing:

Fig. 1 is a perspective view of an aircraft body having the improved inlet;

Fig. 2 is a perspective view of an aircraft body representing a scoop inlet having the improved inlet;

Fig. 3 is a fragmentary front view of a typical conventional supersonic inlet;

Fig. 4 is a fragmentary front view of a supersonic inlet made in accordance with the teachings of the invention;

Fig. 5 is a cross-sectional view taken on line 5—5 of Fig. 3; Fig. 6 is a cross-sectional view taken on line 6—6 of Fig. 1.

In the design of air inlets for supersonic work where diffusion should be accomplished with optimum efficiency, it has been found that inlets capable of obtaining high pressure recovery have a large external compression, and if this large external compression is avoided, the pressure recovery is not satisfactory. The present invention provides an inlet for supersonic use which has a low external compression (drag) and a high pressure recovery capability.

In Figs. 1 and 6 there is shown an aircraft body 10 that is cylindrical in form, representing a variety of aircraft components such as a nacelle or fuselage. The walls 12 of the body are arranged to form a flow passage 13 which encloses a streamtube, and there is a frontal opening 14 at the forward end of the passage 13. The front parts of the walls 12 are shaped to form the curved surface 18 which defines the opening 14. The curvature and size of the surface 18 is designed in accordance with the area of the frontal opening 14 for satisfactory pressure recovery in operation. However, for a single streamtube of appreciable diameter, the surface 18 has to be designed so wide, that there is a high drag condition due to the frontal area involved, when in operation. The large width T' of the surface S is shown in Figs. 3 and 5. Arbitrarily reducing the area of surface S of Fig. 3 will reduce the external compression, but the pressure recovery capability of the inlet is seriously impaired.

As seen in Fig. 1, the total streamtube is divided into a grill of several channels 20 by vanes 22, each channel being similar to a single small inlet. Each of the vanes 22 preferably has a streamlined bulge 23 thereon extending toward the center of the channel 20, so that channel 20 is in the form of a convergent divergent diffuser. In this way the pressure recovery is the same as the pressure recovery of an inlet having large external compression (see Fig. 3), but the curvature of the external surface 18 is larger, reducing frontal area, and the external drag is reduced in proportion to the number of passages used. In other words, the surface 18 of Fig. 1 is designed in curvature and size to be compatible with one of the channels 20 rather than the entire frontal opening. This is shown clearly by comparing the size of the surface S of Figs. 3 and 5 with the size T of a corresponding surface of an inlet having vanes 22. The frontal surface area of the vanes 22 can be ignored as being inconsequential because of the high engine induction around these components which avoid appreciable external compression, except where the vanes project appreciably forward of the inlet, as would be the case with vane 24, so constructed to show that if some external compression is desired it may be obtained by proper placement of one or more of the vanes. High engine induction is the large amount of suction created through the air intake of a jet engine.

The primary benefit derived from an inlet made as described, is the smaller external drag for the same pressure recovery as would be obtained with the same size inlet, made in accordance with standard practices (Fig. 3). But other advantages are also obtained: much more uniform velocity distribution is present at the end of the diffuser; flame holders may be placed in the vanes without increasing drag; and diffusion takes place in a much smaller overall length therefore making the inlet especially adaptable for wing installations and making it possible to reduce the length of a ram jet body.

Among the many possible uses of the invention is its connection with the scoop inlet 30 of Fig. 2, attached to an aircraft body 31, the vanes 32 having streamlined bulges thereon dividing the streamtube into convergent divergent channels 34 so that the surfaces 36 and 38 may be made smaller in frontal area or greater in curvature than would be required in the absence of the vanes 32. In this embodiment, the use and advantages are identical to those described in connection with the embodiment of Fig. 1, and will not be repeated herein. It is understood, however, that various changes may be made without departing from the teachings of the invention.

What is claimed is:

1. An air inlet for aircraft operating at supersonic speeds comprising a flow passage disposed substantially in line with the air stream, said flow passage having a forwardly facing opening in the air stream, and means in said flow passage to enable said passage to accept and decelerate the air with low external compression and with high pressure recovery, said means comprising at least one vane extending across said passage at the inlet end thereof, said vane extending downstream from adjacent the inlet end of said passage and having a streamlined bulge intermediate its upstream and downstream edges, whereby to form a convergent divergent passage.

2. A supersonic air inlet comprising wall means defining a flow passage, said wall means extending in the general direction of the free air stream and having front parts which face into the air stream, said front parts defining a forwardly facing opening, and vane means supported across said opening and extending in the general direction of the free air stream, said vane means defining with said wall means at least two flow channels, at least one of said means having a streamlined bulge thereon extending towards the center of each flow channel, whereby said flow pasage is divided into at least two convergent divergent channels.

References Cited in the file of this patent

UNITED STATES PATENTS

| | | | |
|---|---|---|---|
| 1,983,405 | Schmidt | Dec. 4, | 1934 |
| 2,189,000 | Esposito | Feb. 6, | 1940 |
| 2,221,905 | Berlin | Nov. 19, | 1940 |
| 2,477,637 | Mercier | Aug. 2, | 1949 |
| 2,573,834 | Davidson | Nov. 6, | 1951 |
| 2,694,357 | Lee | Nov. 16, | 1954 |

FOREIGN PATENTS

| | | | |
|---|---|---|---|
| 651,276 | Great Britain | Mar. 14, | 1951 |